Nov. 21, 1967     W. V. THELANDER     3,353,642
FRICTION CLUTCHES
Filed Jan. 10, 1966     3 Sheets-Sheet 1
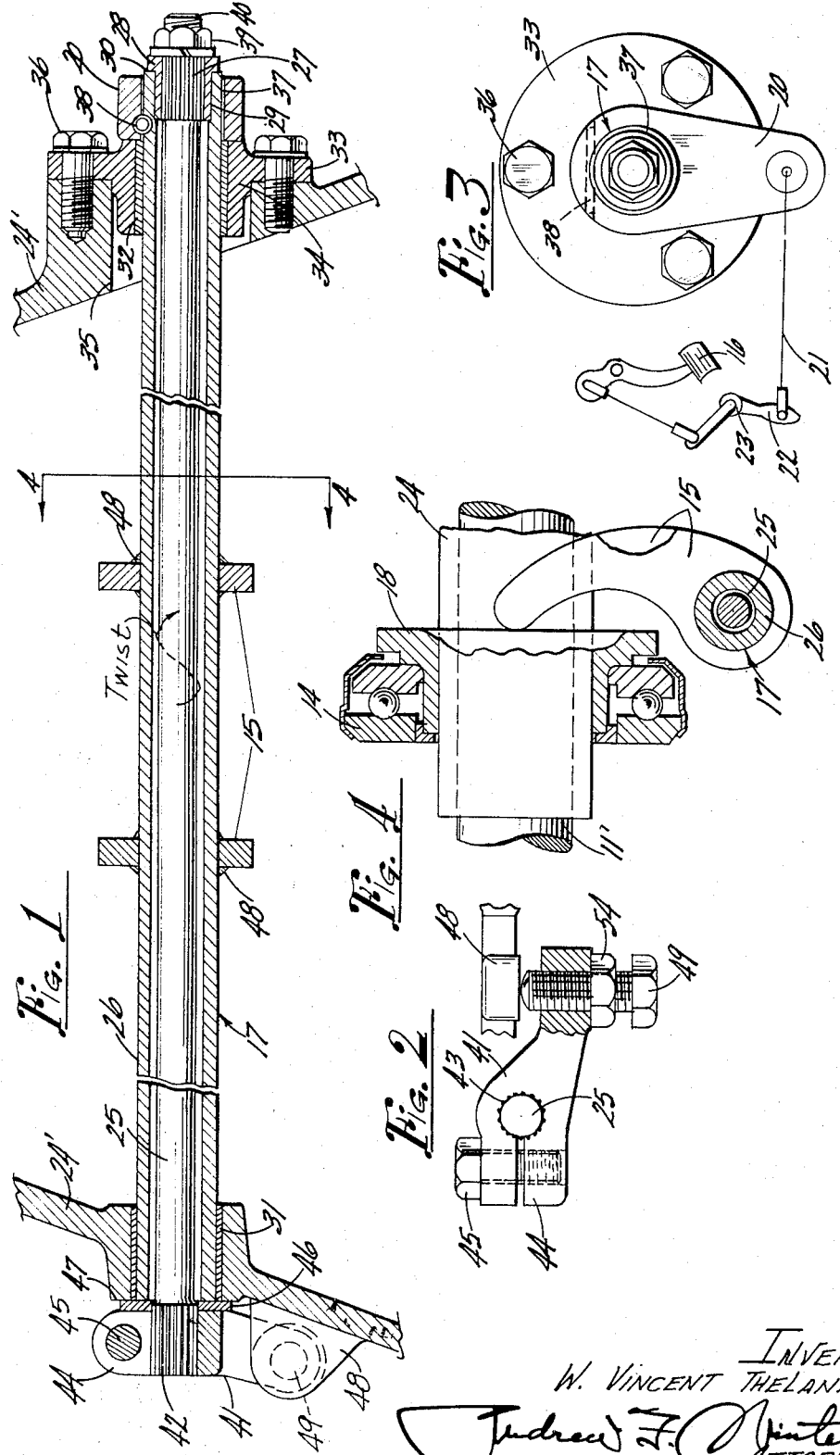
INVENTOR
W. VINCENT THELANDER
ATTORNEY

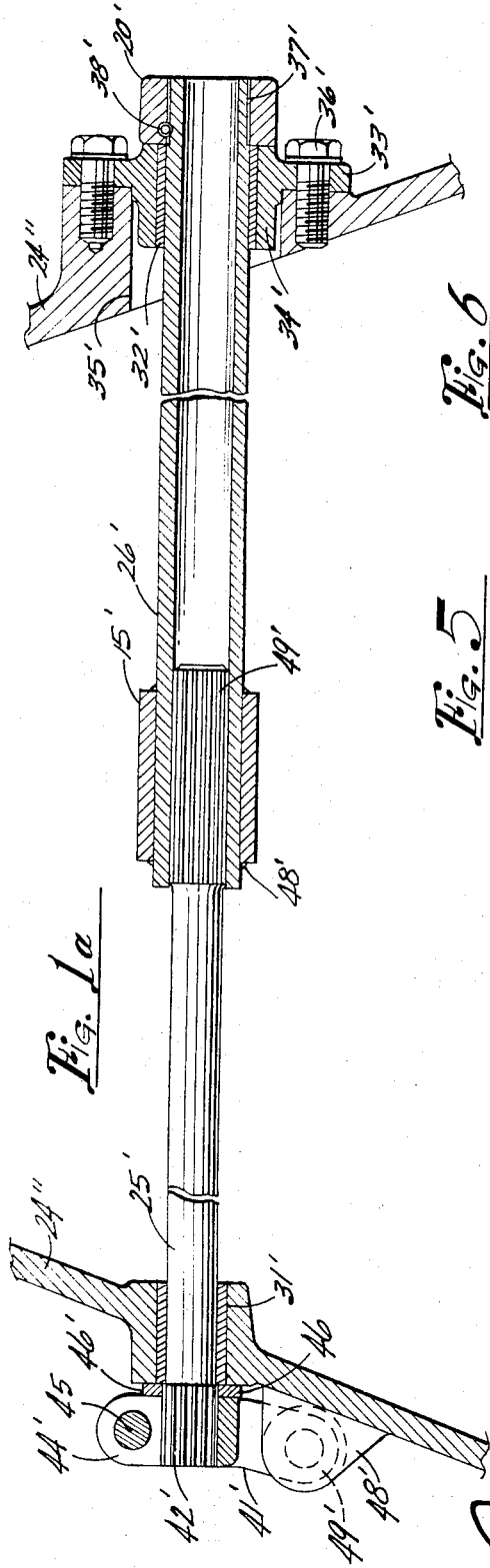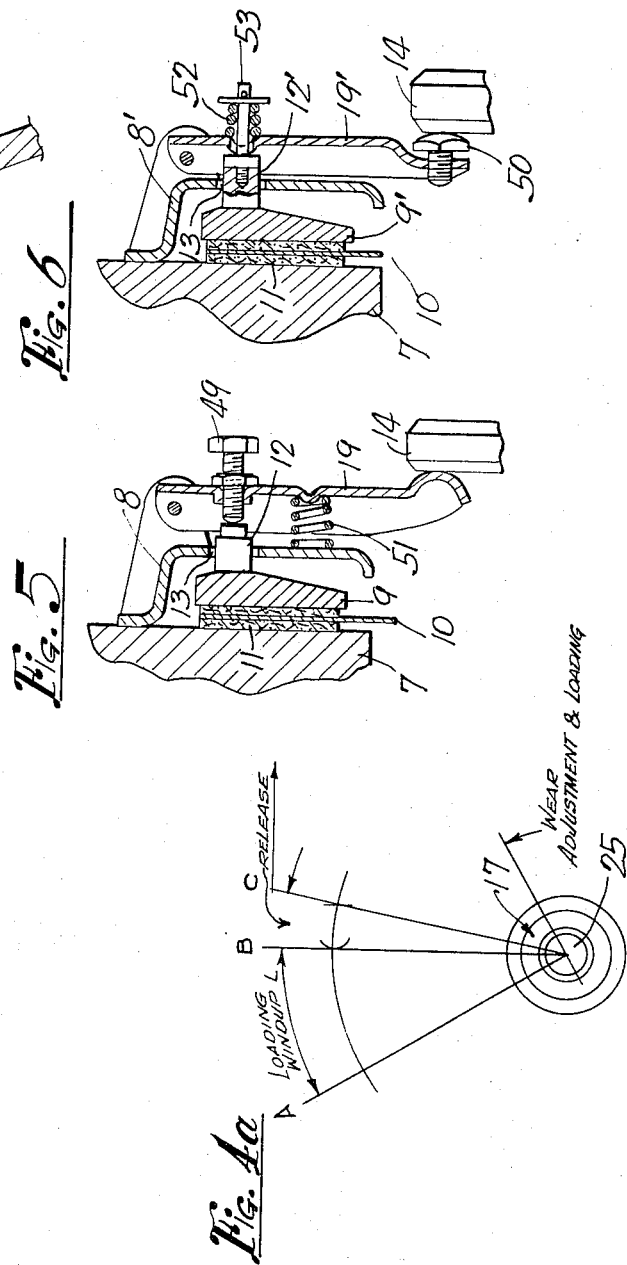

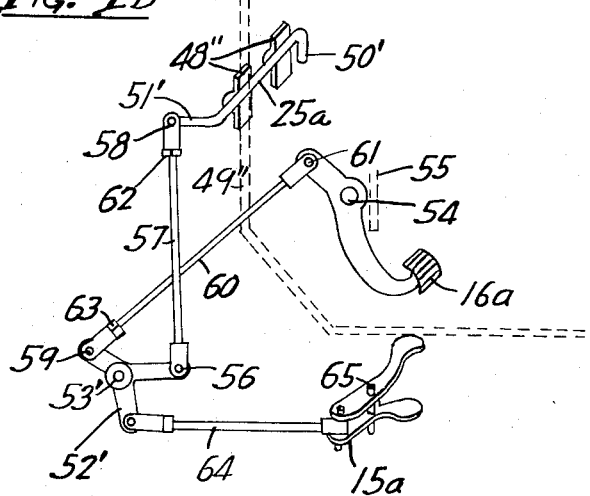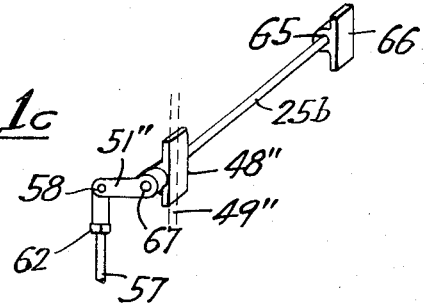

United States Patent Office 3,353,642
Patented Nov. 21, 1967

3,353,642
FRICTION CLUTCHES
W. Vincent Thelander, Sugar Loaf Mountain Ranch,
Box 385, Cave Creek, Ariz. 85331
Filed Jan. 10, 1966, Ser. No. 519,483
21 Claims. (Cl. 192—99)

This invention relates to friction clutches, and is more particularly concerned with improved designs whereby the usual coiled compression springs caged between the pressure plate and back plate holding the clutch engaged can be dispensed with by virtue of the novel use of a suitably loaded torsion bar extending transversely of the clutch housing behind the clutch proper, the spring pressure of which is transmitted through a fork to diametrically opposite sides of an anti-friction bearing and thence through a plurality of clutch levers carried on the back plate with a predetermined amount of pressure multiplication to the pressure plate. I thereby utilize what was previously functioning as the release bearing for transmitting the spring loading to the clutch without employment of any coiled compression springs, while maintaining the bearing under substantially constant loading so long as the clutch is engaged and thereby insure maximum bearing life while at the same time obtaining a clutch that is much simpler to adjust to compensate for wear on the clutch facings. Such adjustments are possible externally of the clutch housing in any suitable or preferred way, as by simple screw adjustment on a lever arm attached to and loading one end of the torsion bar, which, of course, must be maintained under a predetermined loading. At the same time, it is a simple matter also to provide for clutch disengagement, as that involves only the necessity for the clutch release pedal being connected through a lever arm with the other end of the torsion bar to twist it further in the same direction enough to disengage the fork from the aforesaid bearing and thereby release the spring pressure of the torsion bar on the clutch levers. Adjustments for wear may also be achieved by any one of the various automatic wear compensating and adjusting designs commonly used on brakes and clutches.

The torsion bar made in accordance with my invention may be mounted horizontally on the fire-wall in the engine compartment transversely of and behind the engine and clutch housing and be connected through intermediate linkage with the bearing fork on the one hand and with the clutch pedal on the other. That arrangement also affords many advantages.

The invention is illustrated in the accompanying drawings, in which—

FIG. 1 is a longitudinal section in a horizontal plane through the torsion bar assembly showing the wear compensating adjustment at one end, the release lever connection at the other end, and the pressure transmitting fork at the middle;

FIG. 1a is a similar section showing a modified or alternative construction, utilizing a half-length torsion bar;

FIG. 1b is a more or less diagrammatic perspective view illustrating a torsion bar mounted in suitable bearings on the fire-wall at the rear of the engine compartment and connected through intermediate linkage with the bearing fork and clutch pedal, this torsion bar being one-piece construction with right angle bent portions at opposite ends, one bearing against the fire-wall to assume the torque and the other transmitting spring pressure to the clutch through the bearing fork;

FIG. 1c illustrates a variation in the construction of FIG. 1b, wherein one end of a straight torsion bar is splined for connection with a bracket attached to the fire-wall while the other end is mounted to turn in a suitable bearing on said wall and splined for connection with a lever connected similarly as the crank arm on one end of the torsion bar of FIG. 1b to the intermediate linkage;

FIG. 2 is a view of the left hand end of FIG. 1 showing the wear compensating adjustment in side elevation;

FIG. 3 is a view of the right-hand end of FIG. 1 showing the release lever connection in side elevation;

FIG. 4 is a section on the line 4—4 of FIG. 1 showing the fork for transmitting spring pressure from the torsion bar assembly to the central bearing for spring loading of the clutch;

FIG. 4a is a torque loading diagram for the torsion bar showing the relationship of the clutch release operation to the spring loading of the bar, and FIGS. 5 and 6 are fragmentary sectional details showing how the central bearing is arranged to transmit the spring pressure of the torsion bar to the inner ends of the plurality of radially disposed clutch levers through which the spring pressure is transmitted with predetermined multiplication to the pressure plate of the clutch to keep the clutch disc engaged with the fly-wheel, FIG. 5 showing the levers equipped with return springs acting between the back plate and the levers, while FIG. 6 illustrates levers urged inwardly toward the pressure plate independently of the torsion bar to counteract the tendency for the levers to swing outwardly under centrifugal force when the clutch is released.

Similar reference numerals are applied to corresponding parts throughout the views.

Referring to FIGS. 1 to 6, the reference numeral 7 designates a portion of the fly-wheel onto the back of which the back plate 8 or 8' is secured in the usual way, as seen in FIGS. 5 and 6, 9 and 9' being the usual pressure plates in these two figures and 10 the clutch plate with the usual friction facing pads 11 applied to the opposite sides thereof, whereby to transmit drive to a driven shaft 11' in the usual way when the clutch is engaged. Heretofore, as shown for example, in my Patent No. 2,214,780, the pressure plate 9 or 9' was urged toward the fly-wheel by a plurality of coiled compression springs caged between the release levers and the back plate. In other clutches, the springs were caged between the back plate and the pressure plate. The rearwardly projecting drive lugs 12 and 12', shown in FIGS. 5 and 6 as extending through holes 13 with a working fit, were heretofore in the other clutches arranged to be pulled rearwardly against the action of the springs by lever action to release the clutch, the levers being so pivoted relative to the back plate and connected to the lugs and disposed radially with respect to the clutch for operation simultaneously by a central release bearing like that shown at 14 in FIG. 4, to retract the pressure plate and release the clutch when a fork, comparable to that shown at 15 in FIG. 4, was oscillated in response to depression of the clutch pedal, like that indicated diagrammatically at 16 in FIG. 3. That kind of spring-loaded clutch had the disadvantage that the central bearing 14, due to intermittent loading and unloading, had a greatly reduced life. Bearing manufacturers generally claim a longer bearing life where the bearing is substantially constantly loaded, and that is what the present torsion bar loaded clutch of my invention obtains, the central bearing 14, which previously functioned only as a release bearing and was accordingly only intermittently loaded, now functioning to transmit spring pressure from the novel torsion bar assembly 17 through the fork 15 that engages one side of the bearing 14 through the intermediary of a collar 18, while the other side of the bearing 14 engages the inner ends of clutch levers 19 and 19', as seen in FIGS. 5 and 6, to keep the clutch engaged until the clutch pedal 16 is depressed by giving a slight further amount of twist to the torsion bar 17 by clock-wise movement of the lever arm 20 by a pull on the link indicated diagrammatically at 21 connected to the lower end of a rocker arm 22 oscillating on a cross-shaft 23 and operated by the clutch pedal 16. Thus, the central bearing 14 in my clutch, shown as slidably mounted with the collar 18 on a bearing carrier guide 24 provided in the clutch housing 24′, is unloaded only while the clutch is disengaged. This construction, while readily adaptable to all passenger car designs is considered well suited for trucks, as these still employ the cross-shaft type of throw-out, my improved torsion bar assembly 17, as seen in FIG. 1 extending cross-wise of the clutch housing 24′.

Referring now more particularly to FIG. 1 and related FIGS. 2, 3, 4, and 4a, the torsion bar assembly 17 comprises a torsion bar 25 and torsion tube 26 disposed in telescoping relation and connected to one another at one end by splines 27 on the enlarged end portion of the bar fitting in a splined portion provided in the collar 28 that fits in a counter-bore 29 provided in the adjacent end of the tube 26 and is welded or brazed as at 30 to said tube. Both ends of the tube 26 are received in Oilite bearings 31 and 32 for rotation with respect to housing 24′, the bearing 32 being in a circular plate 33 that has a cylindrical boss 34 fitting in and closing an enlarged hole 35 in the side wall of the housing 24′, to which the plate 33 is bolted as indicated at 36. The lever 20 previously mentioned is connected to this same end of the tube 26 by serrations 37 and a cross-pin 38, the lever 20 having abutment with the outside of the center portion of the plate 33 to prevent endwise displacement of the torsion bar assembly 17 to the right. A nut 39 threaded on the reduced threaded end portion 40 of the torsion bar 25 next to the splined portion 27 thereof prevents endwise movement of the torsion bar 25 with respect to the tube 26 to the left. At the other end of assembly 17, a lever arm 41 receives the splined end portion 42 of the bar 25 in its splined hole 43 and is split radially from the hole as seen at 44, and the split portion is arranged to be compressed by means of a bolt 45 to secure the lever arm 41 against displacement from the end of the arm 25 while holding a washer 46 in abutment with the adjacent end of the tube 26 and against the flat face 47 on the adjacent side wall of the housing 24′ to prevent endwise displacement of the torsion bar assembly 17 to the right. A boss 48 projecting from the side wall of the housing 24′ is engaged by an adjusting screw 49 threaded on the free end of lever arm 41. Adjustment of this screw twists the torsion bar 25 through a loading windup from A to B in FIG. 4a, of about 29°, which in one clutch that I have designed along the present lines is equivalent to a pressure plate pressure of 1500 lbs., each of three levers 19 or 19′ disposed 120° apart accounting for 500 lbs. pressure, with a thrust of approximately 274.5 lbs. spring pressure of bearing 14 on the inner ends of these levers due to the twist or spring loading of torsion bar 25, these figures being mentioned, of course, only by way of example to give a better understanding of the operation of these clutches. It is by further twisting of bar 25, as represented from B to C in FIG. 4a, when pedal 16 is depressed, that the clutch is disengaged, fork 15 in this operation backing away from collar 18. The fork 15, it will be seen in passing, is herein shown as defined by two separate fingers, both welded, as at 48, to the middle portion of the tube 26 and disposed on opposite sides of the bearing 24 for engagement with diametrically opposed points on the back of the collar 18.

The operation of the clutch is substantially the same with either of the levers 19 and 19′ shown in FIGS. 5 and 6, the main differences between these levers being:

(1) The location of the screw adjustment 49 intermediate the ends of the lever 19 in FIG. 5, as distinguished from having the screw adjustment 50 on the inner end of the lever 19′ in FIG. 6, and (2) The provision of a return spring 51 in FIG. 5 between the back plate and the lever 19 intermediate the ends of the latter, whereas in FIG. 6 a coiled compression spring 52 is caged on a pin 53 that extends through a hole in the lever 19′ intermediate the ends thereof, and this spring serves to hold the lever in engagement with the lug 12′ on the pressure plate so as to counteract the tendency for the lever to swing outwardly under centrifugal force when the clutch is released, the spring 52 keeping the lever in substantially neutral condition.

Once the screw adjustments 49 or 50 have been made at the factory they need never be touched throughout the life of the clutch, because, whenever wear on the facing pads 11 on the clutch disc 10 necessitates any compensating adjustment in the clutch, that is taken care of externally of the clutch by tightening the screw 49 on the lever arm 41 an appropriate amount after first loosening the lock-nut 54, the latter being tightened again after the adjustment of the screw to maintain such adjustment.

Referring to FIG. 1a, showing a modified or alternative construction, it will be seen that a substantially half-length torsion bar 25′ may be employed in connection with a substantially half-length torsion tube 26′, the torsion bar and tube being suitably interconnected by splines at 49′ at the middle of the assembly 17′ where the end portions of the torsion bar and tube interfit, the fork 15′ being suitably welded as at 48′, to the inner end portion of the tube 26′. Lever arm 41′ connected to the splined outer end 42′ of the torsion bar 25′ functions for the loading windup of this torsion bar similarly as in FIGS. 1 and 2, except that in the present construction torsion bar 25′ has the Oilite bearing 31′ rotatably mounting the same in the side wall of housing 24″. The tube 26′ has lever arm 20′ connected to its serrated outer end, as at 37′, and pinned, as at 38′, similarly as in the construction first described, and this end of the tube is mounted in an Oilite bearing 32′ in a circular plate 33′ that has a cylindrical boss 34′ fitting in and closing an enlarged hole 35′ in the side wall of the housing 24″, to which the plate 33′ is bolted, as indicated at 36′. The operation of this clutch is substantially the same as the one first described.

In both clutches, the reason for the enlarged hole 35 or 35′ with closure plate 33 or 33′ is to facilitate assembling. The torsion bar 25 and tube 26 of the assembly 17 in FIG. 1 with welded throw-out fork 15 is inserted through the hole 35 and then fed to the left into the bearing 31 on the left side of the housing 24′. Then plate 33 with its bearing 32 is brought into position and bolted to the housing, as at 36, after which the lever 20 is applied to the outer end of the tube 26. Assembling the structure of FIG. 1a is similarly facilitated with enlarged hole 35′ and plate 33′.

Referring next to FIG. 1b, the torsion bar 25a is shown horizontally disposed transversely of the rear of the engine compartment and mounted in bearing 48″ on the fire-wall 49″, with one right angle bent end portion 50′ bearing against the wall to assume the twist or torque, while the other right angle bent end portion 51′ serves as a crank for transmitting spring pressure to the clutch through the bearing fork 15a through intermediate linkage. This includes a three-armed bell-crank lever 52′, that is pivoted at 53′ in a fixed spaced relationship to bearings 48″ and also the pivot 54 for the clutch pedal 16a mounted on the instrument board 55. The bell-crank lever 52′ has one arm pivotally connected at 56 through an adjustable length link 57 with the outer end 58 of the torsion bar crank arm 51′, while another arm of the bell-crank is pivotally connected at 59 through an adjustable length link 60 with the crank arm end 61 of the clutch pedal 16a. Threaded adjustments are indicated at 62 and 63 to enable properly correlating the torsion bar 25a to the bearing fork 15a at the outset and then, when the clutch plate facings show enough wear to require a compensating adjustment, that can be made at 62 and a corresponding adjustment can be made at 63 so that the clutch pedal 16a, when depressed to the usual extent, will disengage the clutch. The connection indicated at 64 between the bearing fork 15a and the third arm of the bell-crank lever 52′ is of a resilient type like a flexible cable with a Bowden wire inside it, so as to allow for the anticipated relative movement between the clutch housing, in which the fork 15a is pivoted intermediate its ends on a vertical axis, as indicated at 65, and the automobile or truck body and frame in operation.

The operation of this construction is similar to the others. Once the screw adjustments at 49' or 50' have been made at the factory, they need never be touched throughout the life of the clutch, because, whenever wear on the facing pads 11 on the clutch disc 10 necessitates any compensating adjustment in the clutch, that is taken care of externally of the clutch by shortening the link 57 at 62, after which a compensating adjustment may be needed at 63 on link 60 so that the clutch pedal 16a when depressed to the usual extent will disengage the clutch.

The modification of the construction of FIG. 1b shown in FIG. 1c involves only a change in the torsion bar 25b, which is splined at 65 for connection with a bracket 66 that is fastened to the fire-wall 49", while the other end 67 is splined for connection with a lever 51", connected similarly as the crank arm 51' of FIG. 1b through intermediate linkage with the bearing fork 15a and clutch pedal 16a, as indicated at 57. A bearing 48" fastened to the fire-wall 49" supports the last-mentioned end of the torsion bar 25b. The operation of this form is substantially the same as that of FIG. 1b.

It is believed the foregoing description conveys a good understanding of the objects and advantages of my invention. The appended claims have been drawn to cover all legitimate modifications and adaptations.

I claim:

1. In a friction clutch comprising a clutch plate adapted to be held in frictional engagement with a fly-wheel, a pressure plate for applying spring pressure to said clutch plate in engaged position, a back plate turning with the fly-wheel and operatively connected to turn with the pressure plate, a bearing disposed centrally relative to said clutch and mounted for axial movement to and from clutch engaging position, a fork engaging said bearing and oscillatable to transmit movement thereto, and means for transmitting clutch engaging pressure from said bearing to said pressure plate, the improvement which consists of a preloaded torsion bar serving as a source of clutch engaging spring pressure disposed outside of said clutch but operatively connected with said fork, whereby said bearing, which transmits the spring pressure from said torsion bar and fork to the pressure plate is continuously under spring pressure throughout the engagement of said clutch, and means for disengaging said clutch by relieving the pressure of said fork on said bearing.

2. A friction clutch as set forth in claim 1 including a clutch housing in which the preloaded torsion bar is mounted in transverse relation to said clutch and bearing, the clutch further including preload adjusting means for said torsion bar disposed outside said housing and connected with the outer end of said torsion bar.

3. A friction clutch as set forth in claim 1 including a clutch housing in which the preloaded torsion bar is mounted in transverse relation to said clutch and bearing, the clutch further including preload adjusting means for said torsion bar disposed outside said housing and connected with the outer end of said torsion bar, said preload adjusting means including a fixed abutment relative to which a radius arm fixed to the outer end of said torsion bar is adjustable by means of screw means for varying the spaced relationship of said radius arm to said abutment.

4. A friction clutch as set forth in claim 1 including a clutch housing in which the preloaded torsion bar is mounted in transverse relation to said clutch and bearing, the clutch further including preload adjusting means for said torsion bar disposed outside said housing and connected with the outer end of said torsion bar, said preload adjusting means including a fixed abutment relative to which the radius arm fixed to the outer end of said torsion bar is adjustable by means of screw means for varying the spaced relationship of said radius arm to said abutment, the clutch plate having pads of friction material carried on the marginal portion thereof and engaging the flywheel and pressure plate, the screw means being adjustable externally of said housing to compensate for wear of said pads so as to maintain a predetermined preloading of said torsion bar.

5. A friction clutch as set forth in claim 1 including a clutch housing in which the preloaded torsion bar is mounted in transverse relation to said clutch and bearing, the clutch further including preload adjusting means for said torsion bar disposed outside said housing and connected with the outer end of said torsion bar, the means for relieving pressure of said fork on said bearing comprising a tube connected with said torsion bar in telescoping relationship thereto and extending from said housing and operatively connected with a clutch disengaging member so as to twist said torsion bar further in the direction of its preloading enough to relieve pressure of said fork on said bearing.

6. A clutch as set forth in claim 5 wherein the torsion bar and tube extend the full width of the clutch housing in telescoping relationship to one another, the tube being mounted for rotation in bearings provided in opposed side walls of said housing at opposite ends of said tube.

7. A friction clutch as set forth in claim 5 wherein the torsion bar extends partway from one side wall of said housing to the opposite side wall and is mounted at its outer end in a bearing in the first mentioned side wall, the tube extending partway from the other side wall to the first mentioned side wall and being connected at its inner end with the inner end of said torsion bar in telescoping relationship thereto and mounted in a bearing at its outer end in the second side wall of said housing.

8. A friction clutch as set forth in claim 1 wherein the means for transmitting clutch engaging pressure from said bearing to said pressure plate comprises pressure multiplication levers pivoted at their outer ends on the back plate and extending inwardly toward said bearing and operatively connected with the pressure plate intermediate their ends, each of said pressure multiplication levers having screw threaded means intermediate the ends thereof for connection with said pressure plate, the screw threaded means serving to adjust the relationship of the inner ends of said levers to said bearing.

9. A friction clutch as set forth in claim 8 wherein each of said levers has spring means acting between the same and the back plate to urge the levers outwardly relative to the back plate.

10. A friction clutch as set forth in claim 1 wherein the means for transmitting clutch engaging pressure from said bearing to said pressure plate comprises pressure multiplication levers pivoted at their outer ends on the back plate and extending inwardly toward said bearing and operatively connected with the pressure plate intermediate their ends, each of said pressure multiplication levers having screw threaded means on the inner ends thereof engaging said bearing for adjusting the relationship of the inner ends of said levers to said bearing.

11. A friction clutch as set forth in claim 1 wherein the means for transmitting clutch engaging pressure from said bearing to said pressure plate comprises pressure multiplication levers pivoted at their outer ends on the back plate and extending inwardly toward said bearing and operatively connected with the pressure plate intermediate their ends, each of said pressure multiplication levers having screw threaded means on the inner ends thereof engaging said bearing for adjusting the relationship of the inner ends of said levers to said bearing, each of said levers having spring means connected therewith normally urging the same inwardly toward said back plate.

12. A friction clutch as set forth in claim 1 wherein the means for transmitting clutch engaging pressure from said bearing to said pressure plate comprises pressure multiplication levers pivoted at their outer ends on the back plate and extending inwardly toward said bearing and operatively connected with the pressure plate intermediate their ends, said pressure plate having drive lugs projecting rearwardly therefrom through holes provided in said back plate, and each of said levers having screw threaded means on the inner ends thereof engaging said bearing for adjusting the relationship of the inner ends of said levers to said bearing, each of said levers having spring means connected therewith normally urging the same inwardly toward said back plate, the spring means being in the form of compression springs caged on projections on said drive lugs that extend through holes provided therefor in said levers, said spring means engaging the backs of said levers.

13. A friction clutch as set forth in claim 1 including a clutch housing in which the preloaded torsion bar is mounted in transverse relation to said clutch and bearing, the clutch further including clutch plate wear compensating means disposed outside said clutch and operatively associated with the outer end of the torsion bar, whereby in compensating for wear on the clutch plate the preload on the torsion bar is returned to approximately its original value.

14. A friction clutch as set forth in claim 1 wherein the means for disengaging said clutch operates to twist said torsion bar further in the direction in which it is already preloaded, thereby relieving the pressure of said fork on said bearing.

15. A friction clutch as set forth in claim 1 wherein the torsion bar is mounted on a support in remote relation to the clutch and clutch housing, one end of said torsion bar being fixed in relation to said support, and the other end of said torsion bar being connected through intermediate linkage with said bearing fork on the one hand and with said clutch disengaging means on the other.

16. A friction clutch as set forth in claim 1 wherein the torsion bar is mounted on a support in remote relation to the clutch and clutch housing, one end of said torsion bar being fixed in relation to said support, and the other end of said torsion bar being connected through intermediate linkage with said bearing fork on the one hand and with said clutch disengaging means on the other, the intermediate linkage including preload adjusting means for said torsion bar.

17. A friction clutch as set forth in claim 1 wherein the torsion bar is mounted on a support in remote relation to the clutch and clutch housing, one end of said sorsion bar being fixed in relation to said support, and the other end of said torsion bar being connected through intermediate linkage with said bearing fork on the one hand and with said clutch disengaging means on the other, the intermediate linkage including preload adjusting means for said torsion bar, said preload adjusting means including a link length adjustment in said intermediate linkage.

18. A friction clutch as set forth in claim 1 wherein the torsion bar is mounted on a support in remote relation to the clutch and clutch housing, one end of said torsion bar being fixed in relation to said support, and the other end of said torsion bar being connected through intermediate linkage with said bearing fork on the one hand and with said clutch disengaging means on the other, the clutch further including clutch plate wear compensating means disposed outside said clutch operatively associated with one end of the torsion bar, whereby in compensating for wear on the clutch plate, the preload on the torsion bar is returned to approximately its original value.

19. A friction clutch as set forth in claim 1 wherein the torsion bar is mounted on a wall in preloaded condition and connected through intermediate linkage with the bearing fork on the one hand and with the clutch disengaging means on the other.

20. A friction clutch as set forth in claim 1 wherein the torsion bar is mounted on a wall in preloaded condition and connected through intermeditae linkage with the bearing fork on the one hand and with the clutch disengaging means on the other, said torsion bar having its opposite ends bent to form crank arms, the crank arm on one end bearing against the wall to assume the torque, and the crank arm on the other end serving to transmit spring pressure from said bar through the intermediate linkage to said bearing fork.

21. A friction clutch as set forth in claim 1 wherein the torsion bar is mounted on a wall in preloaded condition and connected through intermediate linkage with the bearing fork on the one hand and with the clutch disengaging means on the other, one end of said torsion bar being fixed against turning relative to a support on said wall, and the other end of said torsion bar being rotatable in a bearing on said wall and having a crank arm attached thereto to transmit spring pressure from said bar to said bearing fork.

References Cited

UNITED STATES PATENTS

| | | | |
|---|---|---|---|
| 1,861,253 | 5/1932 | Wemp | 192—99 |
| 2,239,968 | 4/1941 | Meech | 192—68 |
| 2,870,893 | 1/1959 | Palm | 192—68 X |
| 3,218,828 | 11/1965 | Thelander | 192—107 X |

MARK M. NEWMAN, *Primary Examiner*

A. T. McKEON, *Assistant Examiner.*

UNITED STATES PATENT OFFICE
CERTIFICATE OF CORRECTION

Patent No. 3,353,642                        November 21, 1967

W. Vincent Thelander

It is hereby certified that error appears in the above numbered patent requiring correction and that the said Letters Patent should read as corrected below.

Column 6, line 1, for "which the" read -- which a --.

Signed and sealed this 17th day of December 1968.

(SEAL)
Attest:

Edward M. Fletcher, Jr.                      EDWARD J. BRENNER
Attesting Officer                            Commissioner of Patents